March 14, 1933.  W. C. BROEKHUYSEN  1,901,828

ELECTRICAL SYSTEM OF DISTRIBUTION

Filed Feb. 14, 1925  2 Sheets-Sheet 1

Willem C Broekhuysen INVENTOR.

BY Robert S. Blair ATTORNEY.

March 14, 1933.  W. C. BROEKHUYSEN  1,901,828
ELECTRICAL SYSTEM OF DISTRIBUTION
Filed Feb. 14, 1925  2 Sheets-Sheet 2
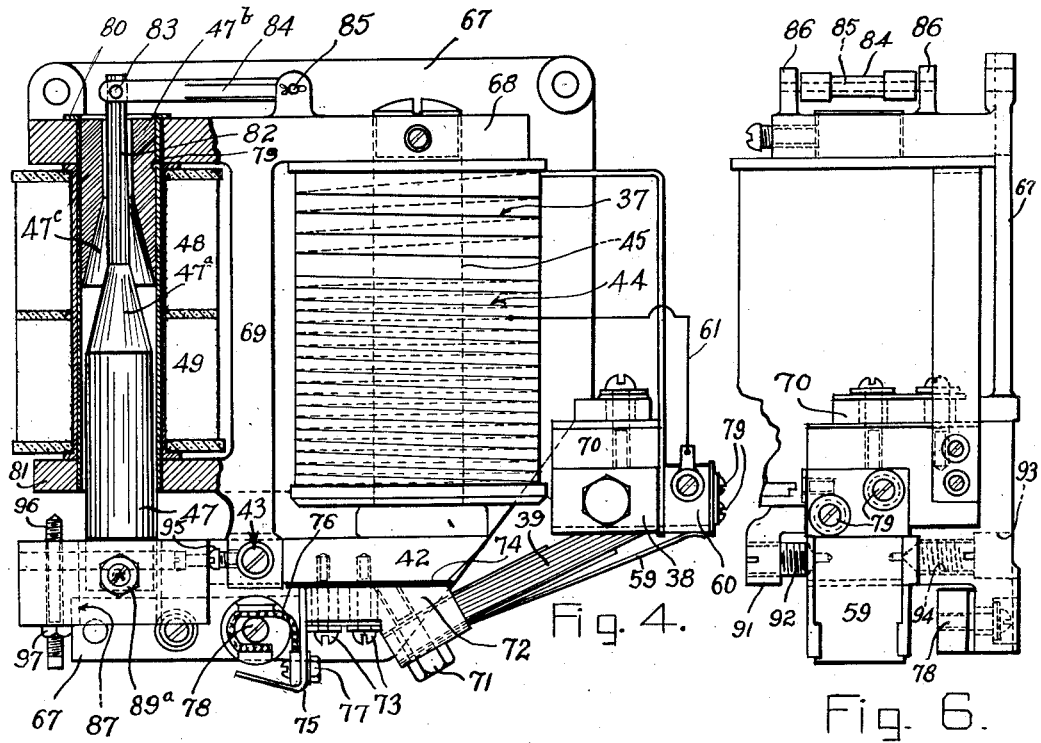
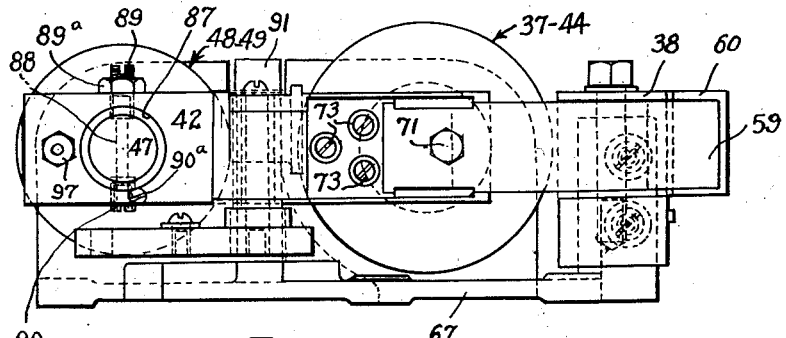
Willem C. Broekhuysen INVENTOR.
BY
Robert S. Blair ATTORNEY.

Patented Mar. 14, 1933

1,901,828

UNITED STATES PATENT OFFICE

WILLEM C. BROEKHUYSEN, OF NEW HAVEN, CONNECTICUT, ASSIGNOR TO THE SAFETY CAR HEATING & LIGHTING COMPANY, A CORPORATION OF NEW JERSEY

ELECTRICAL SYSTEM OF DISTRIBUTION

Application filed February 14, 1925. Serial No. 9,144.

This invention relates to improvements in electrical systems of distribution and more particularly to systems in which a storage battery is utilized for supplying at times energy to various translating devices and in which the storage battery is intended at times to be connected to and disconnected from a generator operating either at intervals or at variable speeds or both. More particularly, this invention relates to car lighting systems of the above-mentioned character.

An object of this invention is to provide an electrical system of distribution of wide range of operation, of high efficiency of action, and of thorough dependability when in use. Another object is to provide a system of the above-mentioned nature in which the connection of the generator to the storage battery may be brought about not only automatically but also in a thoroughly reliable and dependable manner; more particularly, it is an aim of this invention to provide a system of the above-mentioned character in which the generator may be automatically connected to the storage battery as soon as the generator voltage has reached substantially that of the battery and to achieve this action irrespective of the wide range of variation in voltage of the storage battery while at the same time preventing in a thoroughly practical and dependable manner any unintentional or accidental connection of the generator to the storage battery other than at the above-mentioned appropriate conditions. Another object of this invention is to provide an automatic switch for connecting together two sources of current, the voltage of one of which may vary throughout substantial ranges, and at the voltage of the other source irrespective of relatively wide changes in the voltage of the latter; and to provide an automatic switch of this type of wide adaptability, of wide range of action, and capable of effectively and dependably guarding against accidental or unintentional closure of the switch. Another object is to provide apparatus for carrying out the above-mentioned object which will be well adapted to meet the varied conditions of hard practical use. Other objects will be in part obvious or in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings in which are shown illustratively several of various possible embodiments of this invention, Figure 1 is a diagrammatic representation of a system embodying one form of my invention as applied to a car lighting system in which the generator is driven, for example, from a car axle;

Figure 4 is a front elevation partly in section of an automatic switch for carrying out my invention as diagrammatically illustrated in Fig. 2.

Figure 5 is a bottom view of the structure shown in Figure 4, and

Figure 6 is an end view of the switch as seen from the right-hand end of Figure 4, certain parts being either broken away or shown in section to illustrate certain features of construction more clearly.

Similar reference characters refer to similar parts throughout the several views in the drawings.

Figure 1:
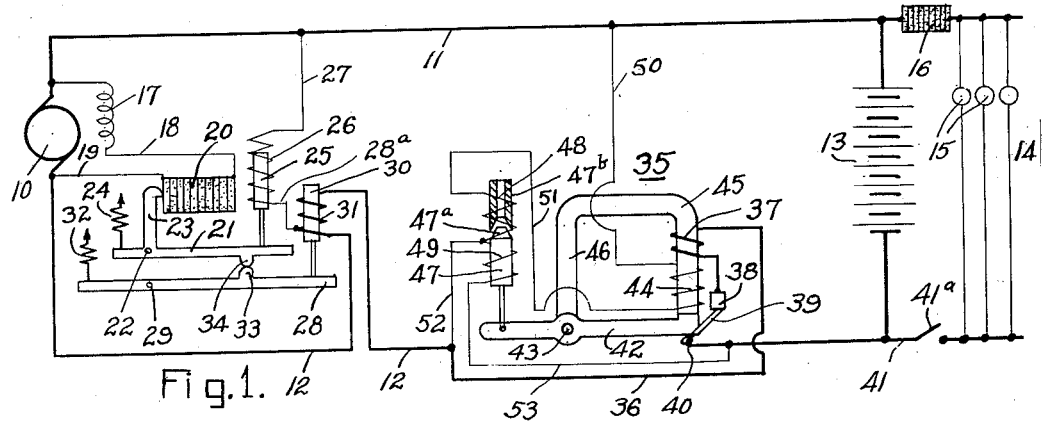

Referring now to the drawings and more particularly to Figure 1, there is shown at 10 a generator adapted to be driven from a variable source of power, such as the axle of a car. The speed of the generator will thus vary substantially with the speed of rotation of the car axle and the operation of the generator will be thus dependent upon the movement of the car. Energy of the generator 10 is supplied through the conductors 11 and 12 to a storage battery 13 and a translation circuit generally indicated at 14. The translation circuit 14 may include various translating devices, and in a car lighting system will include appropriate lamps 15, the voltage of which is to be kept substantially constant. The voltage impressed across the conductors 11 and 12 may vary throughout substantial ranges, depending upon various factors. For example, should the battery 13 be connected to the generator 10 and its charge thereby substantially completed, the voltage across the battery 13 will be relatively high and may be in the neighborhood, for example, of forty volts; on the other hand, should the generator be at rest and hence disconnected from the battery 13 the voltage of the battery may vary throughout a substantial range below forty volts (in the case of a 16-cell battery) depending, for example, upon the state of charge of the battery, and also upon the load which the translation circuit 14 imposes upon the battery 13. To keep the voltage of the translating circuit 14 and hence the voltage impressed across the lamps 15 constant, there is interposed between the translation circuit 14 and the battery and generator, a variable resistance device 16 preferably in the form of a carbon pile and automatically controlled; this device is merely diagrammatically illustrated in the drawing inasmuch as its detailed features constitute no part of this invention and may take various well known forms.

The output of the generator 10 is preferably controlled by controlling in turn the excitation of the generator where the latter takes the form of a shunt wound generator. Thus at 17 is shown the field winding of the generator 10, one terminal of which is connected to one terminal of the generator 10 and the other terminal being connected by the conductors 18 and 19 through a carbon pile 20 to the other terminal of the generator 10. The control of the carbon pile 20 may be achieved in various ways and in the drawings there is illustratively set forth a preferred form of apparatus for controlling the pressure on the carbon pile 20 and hence for controlling the output of the generator 10.

Thus in Figure 1, for example, there is shown a bell crank lever 21 pivoted as at 22, the vertical arm 23 of which bears against the free or unanchored end of the carbon pile 20; a spring 24 acts upon the bell crank lever 21 in a direction to cause the arm 23 to hold the carbon pile 20 under a substantial degree of compression. At the right-hand end of the bell crank lever 21 is connected a core 25 acted upon by a voltage coil 26 connected directly across the generator, as by the conductors 27—28a. In proximity to the bell crank lever 21 is mounted in any suitable manner another lever 28, pivoted as at 29. At the right-hand end of the lever 28 is connected a core 30 adapted to be acted upon by a current coil 31 preferably connected in circuit with the conductor 12 so as to be responsive to the current output of the generator 10. The action of the solenoid 30—31 may be determined by a spring 32 conveniently connected to the lever 28 at the other or left-hand end thereof.

Assuming the generator 10 to be driven at a suitable speed which may vary throughout wide ranges, and assuming that the generator 10 is connected to the battery 13, for example, so that the latter may receive a charge from the generator 10, the current output of the generator 10 will be maintained substantially constant throughout speed changes by the action of the solenoid 30—31. The lever 28 is provided with an upwardly directed projection 33 and in line therewith is a downwardly directed projection 34 on the lever 21. During the regulation of the generator 10 for substantially constant current output, as, for example, during the major portion of the charge of the storage battery 13, the current coil 31 will be effective to control the pressure on the carbon pile 20 by the action of lever 28 acting through the lever 21, the projecting portions 33—34 being at this stage in interengagement. As thus arranged, the charge of the battery 13 may proceed, the output of the generator 10 being held substantially constant irrespective of speed changes of the driving source of power connected to the generator 10.

As the battery 13 approaches substantially full charge, its back E. M. F. is characterized by a relatively abrupt rise so that in order to maintain a continued constant current input to the battery 13 a substantially correspondingly abrupt rise in voltage of the generator 10 must take place as the charge proceeds. But this rise in voltage is effective to bring into action the voltage coil 26 of the regulating apparatus, the coil 26 having been with respect to the spring 24 so predetermined that it can overcome the action of the spring 24 only when the predetermined voltage is reached. The voltage coil 26 thus proceeds to limit the voltage of the output of the generator 10 and, in holding this voltage substantially constant, permits the charging current to the battery 13 to taper off due to the continued rise and back E. M. F. of the battery 13 as the charge proceeds. This tapering off of the charging current to the battery 13 decreases the current in the current coil 31, causes the core 30 and its attached lever 28 to drop substantially out of action, and leaves the control of the generator regulation to the voltage coil 26. Of course the current coil 31, as shown in Figure 1, is arranged to become effective at all times to limit the output of the generator 10 so that the latter cannot be overloaded due, for example, to a heavy load in the translation circuit.

From the foregoing, it will be perceived that the voltage of the storage battery 13 may vary throughout substantial ranges. Assuming the generator to be disconnected from the battery, the voltage of the battery will be substantially high if it is still in a state of charge approaching full charge; on the other hand, the voltage of the battery 13 will be substantially lower if its state of charge approaches substantial discharge, and it might at this point be noted that, should the battery remain connected to a load after it has reached a state of substantial discharge, its voltage will very rapidly drop below normal, and where the battery is a 16-cell battery, its voltage may drop very rapidly to a value in the neighborhood of twenty-four volts.

In the usual type of system of this character, the generator is arranged to be automatically connected to the storage battery and load circuit as soon as the generator voltage has reached a predetermined value. Assuming that the battery is in a state of substantial charge, its voltage will be relatively high; if the automatic switch is arranged to connect the generator to the battery at a voltage slightly under this relatively high value of battery voltage, the automatic switch thus operated will be at once opened, due to the back discharge of the battery to the generator, and there will ensue a series of closures and openings of the switch depending in length upon the period of time that it takes the generator voltage to increase sufficiently to prevent a back discharge from the battery through the generator. Thus, the apparatus is subjected to repeated and unnecessary operations, energy from the storage battery is wasted, and the system subjected to repeated shocks. On the other hand, should the battery be in a state of substantial discharge or as above illustratively set forth, should the battery be completely discharged and still connected to its load, the battery and load cannot be supplied with energy until the generator has been brought up to a voltage materially higher as set by the switching apparatus, than that necessary to supply charging current to the battery. This may take a considerble period of time, inasmuch as the generator may, in a car lighting system, well be driven in the neighborhood or just above the critical speed for relatively long intervals of time, during which the continued discharge of the battery may cause it material harm. Particularly do such conditions arise on so-called "short haul" runs, where the train makes repeated and frequent stops and does not attain substantial speeds for substantial periods of time. In such cases it is highly desirable to achieve the connection of the generator to the battery 13 at the earliest possible moment and to maintain the connection of the generator to the battery as long as possible throughout the raise and fall respectively in the speed of the generator. It is thus a dominant aim of this invention to provide an electrical system in which this object may be achieved in a thoroughly practical manner.

In systems of the above-mentioned nature, the apparatus carried by the car or vehicle is subjected to vibrations and shocks due to the movement of the vehicle, these shocks varying in accordance with the character of the movement to which the vehicle is subjected. If the vehicle is at rest or moving at a rate of speed below critical, it is highly desirable to prevent the connection of the generator to the storage battery either by reason of the effect of the vibrations or shocks upon the switching mechanism or by reason also of accidental manual manipulation of the switching apparatus. A further aim of this invention resides in the provision of an electrical system in which this advantage as well as the above-mentoned object may be readily achieved.

Turning now again to Figure 1 of the drawings, there is generally indicated at 35 a switching apparatus adapted to be interposed between the generator 10 and the storage battery 13; conveniently, the active switching parts of this mechanism 35 may be interposed in the conductor 12. Thus, the conductor 12 will be seen to be extended by way of the conductor 36 through a current coil 37 of the switch 35 to a fixed contact 38 with which is adapted to coact a movable switching member 39 connected as by the flexible conductor 40 to the conductor 41 to which in turn is connected one side of the battery 13, and which forms part of the translation circuit 14. The switching member 39 is mounted upon one end of an armature 42 pivoted at 43 so as to permit movement of the switching member 39 into or out of contact with the fixed contact member 38. In Figure 1 the contacts are shown in circuit closing position.

The armature 42 is adapted to be moved in circuit closing direction by means of a coil 44 connected across the generator 10, preferably permanently, so as to be responsive to generator voltage. The coil 44 is provided with a fixed core 45 and preferably the latter is shaped in the form of a yoke to provide another downwardly extending member 46 thereof to the lower end of which the armature 42 is pivoted as at 43. These parts are made of suitable magnetic material, and thus preferably form a closed magnetic circuit.

The armature 42 is extended in a direction toward the left, and to this extension is pivotally connected a movable core 47 of a solenoid having a winding comprising the coils 48 and 49. This solenoid is preferably so related with respect to the magnetic circuit in which the armature 42 is included that its magnetic circuit is independent of the magnetic circuit which is affected by the voltage coil 44 and the holding or current coil 37. Preferably also this solenoid is of the type which, for a given voltage or net energizing flux will exert a constant pull through its core throughout the range of movement to which the core is subjected. This latter effect may be achieved, for example, by the arrangement diagrammatically shown in Figure 1, in which it will be seen that the upper end of the core 47 is tapered off as at 47a and coacts with a fixed core member 47b, the lower end of which is provided with a recess substantially correspondingly tapered as the upper end 47a of the core 47.

The coil 48 of the winding forming part of the solenoid is a voltage responsive coil connected to be energized by the generator; advantageously the coil 48 of the solenoid and the coil 44 of the magnet are connected in series and across the generator. The circuit of these two coils will be seen to extend from the conductor 11, thence by way of conductor 50 through coil 44, conductor 51, coil 48, and conductor 52 to the conductor 12. One terminal of the coil 49 forming part of the winding of the solenoid is connected to the generator side of the contacts 38—39 of the switch 35, and will be seen to be connected by a conductor 52 to the conductor 12, and hence in effect to the fixed contact 38 of the switch 35; the other terminal of coil 49 is connected as by a conductor 53 to the conductor 41 and hence to the battery side of the switching contacts 38—39. The coil 49 is thus connected to be responsive, as long as the switch contacts 38—39 are open, to the difference in potential between the generator 10 and the battery 13.

The coils 48 and 49 may conveniently be wound as a single winding, the conductor 52 being connected to an intermediate turn of this winding so as to form the two coils 48—49 as above described; preferably this tap is made at such a point that the coil 49 will have about twice as many turns in it as there are turns in the coil 48. The movable parts are preferably so proportioned that, with respect to the pivoting point 43, the parts are mechanically balanced.

Assuming the generator 10 to be at rest, and the switch 35 open at contacts 38—39, the coil 49 of the solenoid will be energized by current from the battery 13, the circuit being completed through the armature of the generator 10. The flux produced by the coil 49 produces upon the core 47 of the solenoid a substantial pull and holds the armature 42 securely in circuit opening position. Thus, as long as the generator 10 is at rest or operating below the region of critical speed, the switch 35 will be securely held in open position against either accidental manual closure or closure by reason of abrupt vibration or shock. At this point it might be noted that a current will flow through the coil 49 as long as the switch contacts 38—39 are open and either when the battery voltage exceeds the generator voltage or when the generator voltage exceeds the battery voltage. Prior attempts to achieve certain of the objects of this invention have included the provision of a holding coil on the automatic switch bridged across the contacts of the switch, so as to be responsive to the difference in voltage between the generator and the battery; but such prior attempts are characterized by the disadvantage that a failure to close the switch at the critical voltage brings about a continued energization of such a holding coil after the generator voltage has exceeded the battery voltage so that the switch is held open during exactly those intervals of time when it is desired that it be closed. Particularly does this disadvantage in prior attempts arise when the battery voltage is very low as by reason of substantial discharge or discharge beyond the desired limit of discharge. A further and dominant aim of this invention is to prevent such disadvantageous action from arising, and in fact to achieve the connection of the generator to the storage battery at substantially precisely the voltage of the latter and irrespective of the range of variation to which the voltage of the latter may be subjected.

As the generator 10 starts up and assuming its speed and hence its voltage to increase gradually, the energization of the coils 44 and 48 will increase at a substantially corresponding rate. The coils 44 and 48 may have substantially the same number of turns in their windings, but preferably the coil 44 is made slightly stronger, as by providing it with a few more turns, than the coil 48, as will be more clearly pointed out hereinafter. As the generator voltage thus increases and approaches equality with the voltage of the storage battery 13, the strength of the coil 49 decreases correspondingly, but the latter coil having more turns therein than the coil 48, the rate of decrease in flux of the coil 49 will be greater than the rate of increase of flux of the coil 48; as long as the generator voltage is less than that of the battery, the fluxes produced by the coils 48 and 49 are in the same direction, and are hence additive, and during this period the two coils act together to securely hold the switch 35 open. But as soon as the voltage of the generator 10 substantially equals the voltage of the battery 13, the flux produced by the coil 49 is substantially zero, so that there is now effective upon the armature 42 the flux due to the coil 44 and tending to swing the armature 42 in circuit closing direction, and the flux due to the coil 48 tending to hold the armature 42 in circuit opening position. At this moment the pulls of these two coils are substantially equal, but as above pointed out, the coil 44 is made slightly stronger, as by adding a few turns, than the coil 48. The greater effect thus produced by the coil 44 upon the balanced mechanical system is at once effective to begin movement of the armature 42 in circuit closing direction, the effective action of the coil 44 increasing as the air gap between the moving armature 42 and the core 45 is decreased. The switch is thus closed and the subsequent flow of current from the generator 10 to the load and battery circuit through the holding current coil 37 acts to securely hold the switch in closed position.

Should the initial movement of the armature 42 in circuit closing direction be delayed for any reason, thus permitting the generator voltage to exceed the battery voltage, a current flow through the coil 49 will take place, but this time in a reverse direction, and will hence produce flux opposing that of the holding coil 48. The opposing action of the coil 49 thus materially weakens the holding action of the coil 48, and thus the opposition to movement of the balanced mechanical system which the coil 44 must overcome is at once reduced, and in effect the coil 44 is made more effective to bring about the immediate closure of the switch contacts 38—39. Moreover, the coil 49 having more turns than the coil 48, the opposing action of the former upon the latter during this stage increases at a greater rate than the increasing strength of the coil 48 with continued increase in generator voltage, and thus the above-mentioned action is not only accentuated but also accelerated. Thus, it will be seen that the possibility of the switch being held open after the generator voltage begins to exceed that of the battery is effectively precluded, and the desired action of the switch is thus positively assured.

The preferred embodiment above described, whereby the coil 44 is made slightly stronger than the coil 48 will thus be seen to achieve a closure of the switch at a voltage of the generator substantially precisely that of the battery, although even if the coil 44 were arranged to effect as great a pull upon the balanced mechanical system as is achieved by the coil 48, it will be seen that the connection of the generator to the battery will be achieved immediately upon the beginning of the generator voltage to exceed the voltage of the battery, since such action through the opposing coil 49 brings about an immediate operation of the switch. The proportioning of the coils 44 and 48 with respect to their related parts so that the former is slightly stronger than the latter is, however, of particular advantage in connection with a preferred embodiment of the balanced mechanical system; in this preferred embodiment the movable mechanical parts are preferably so proportioned that there is a slight over-weight on that side of the pivot of the movable parts whereby the movable parts tend normally to move in circuit opening direction. This latter arrangement is preferred as a safeguard against a condition which may arise in practice, and whereby none of the coils of the switch are energized. Thus, assuming that the battery lead be open, the coil 49 normally holding the switch open when the generator 10 is at rest or running below the region of critical speed will be deenergized, but the slight over-weight on one side of the pivot will hold the switch in open position.

Returning now to the operation of the system as described above in connection with Figure 1, with the switch in closed position, the coil 44 and the current holding coil 37 act together to hold the armature 42 in attracted position, and the switch contact 39 in contact with the fixed member 38; the coil 49 is deenergized whereas the coil 48 of the solenoid remains energized just as does the coil 44 of the magnet. The pull exerted by the flux of the coil 48 is proportional to the instantaneous voltage of the generator, and as hereinbefore noted the pull of this flux on the core 47 remains constant for a given voltage throughout the range of movement of the core 47. Should the generator speed or voltage decrease to a value substantially equivalent to the voltage of the battery 13, the current in the holding coil 37 will be substantially zero, but upon a further decrease in speed or voltage of the generator 10, the battery 13 begins to discharge through the generator 10, the resultant reversal in current flow through the coil 37 opposing the holding action of the coil 44 of the magnet. Inasmuch as the coil 48, however, exerts a pull tending to open the switch which is proportional substantially to the instantaneous voltage of the generator, it will be seen that the action of the coil 44 need be opposed to but a very slight extent to permit the pull exerted by the coil 48 of the solenoid to preponderate. The coil 48 thus pulls the switch open and acts to held the switch in open position as long as the generator continues to run below the region of critical speed, but during this period of time the holding action of the coil 48 is supplemented by the aiding effect of the coil 49 which has become energized upon the opening of the switch contacts 38—39. Should the generator come to rest or its voltage become insufficient to materially energize the coil 48, the coil 49 remains effective to hold the switch securely in open position.

Figure 2:
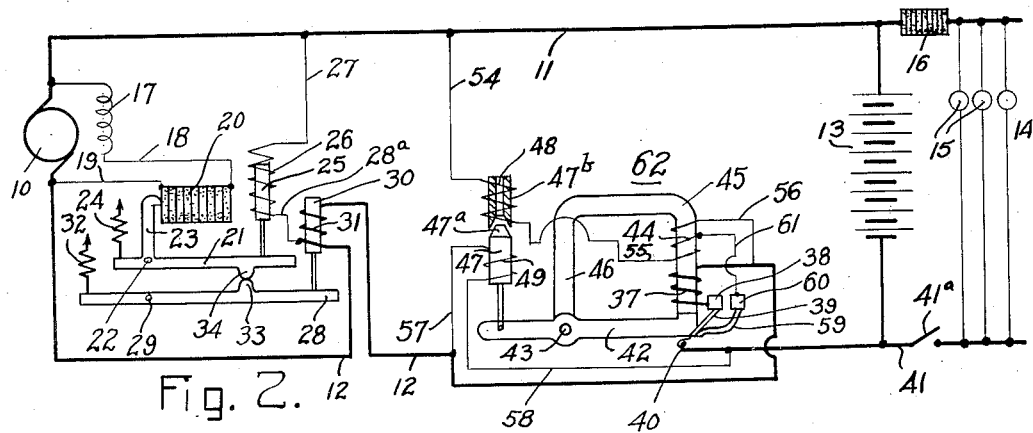
Figure 2 is a modified but preferred embodiment of my invention.

In order to effect the disconnection of the generator from the battery as the speed or voltage of the former decreases and without necessitating a substantial back discharge from the battery, I prefer to embody the switching mechanism 35 of Figure 1 in the form indicated generally at 62 in Figure 2, and in which two figures like characters of reference refer to like parts throughout. In Figure 2, the lifting coil 44 is serially connected with the holding coil 48 of the solenoid so that both will be responsive substantially to a generator voltage; the circuit of these two coils, however, will be seen to extend from one side of the generator, as from the conductor 11, by way of the conductor 54 through the coil 48, thence by way of conductor 55, through the coil 44 and by way of conductor 56 to the conductor 12. The coil 49 coacting with the coil 48 of the solenoid is connected by conductor 57 to conductor 12 and by conductor 58 to conductor 41; hence is connected across the switch contacts 38—39. The action of the system shown in Figure 2 in connecting the generator 10 to the storage battery 13 is substantially identical with that hereinabove described in connection with Figure 1, but the armature 42 carries in addition to the contact 39 an auxiliary contact member 59, the latter being adapted to coact with an additional fixed contact 60 positioned preferably adjacent the fixed contact 38. A conductor 61 connects an intermediate point in the coil 44 with the fixed contact 60. Upon the closure of the switch 62 of Figure 2, therefore, the upper section of the coil 44 included between the points where the conductors 61 and 56 are connected thereto is short-circuited, and the action of the coil 44 in holding the switch closed in conjunction with the current holding coil 37 is materially decreased. At the same time there is brought about a slight change in the resistance of the circuit in which the coil 44 and the coil 48 are included so that the coil 48 of the solenoid is increased in strength to a corresponding extent.

As the voltage of the generator decreases and approaches that of the battery, the current flowing through the holding coil 37 decreases progressively and approaches zero. Preferably, the number of turns of the coil 44 which are short-circuited upon the initial closure of the switch is so chosen that at substantially zero current in the current coil 37 or a slight reverse current therein, the pull of the coil 48 of the solenoid is sufficient to overcome the holding action of the coil 44 and begin the movement of the armature 42 in circuit opening position. As soon as this movement has begun the air gap between the armature 42 and the core 45 is materially increased so that the coil 48 can effectively complete the movement of the armature 42 in circuit opening direction even though the opening of the contacts 59—60 restores the previously short-circuited turns of the coil 44 to normal position. A continued decrease in the speed or voltage of the generator, being effective to bring about an energization of the coil 49, insures the holding open of the switch.

Figure 3:
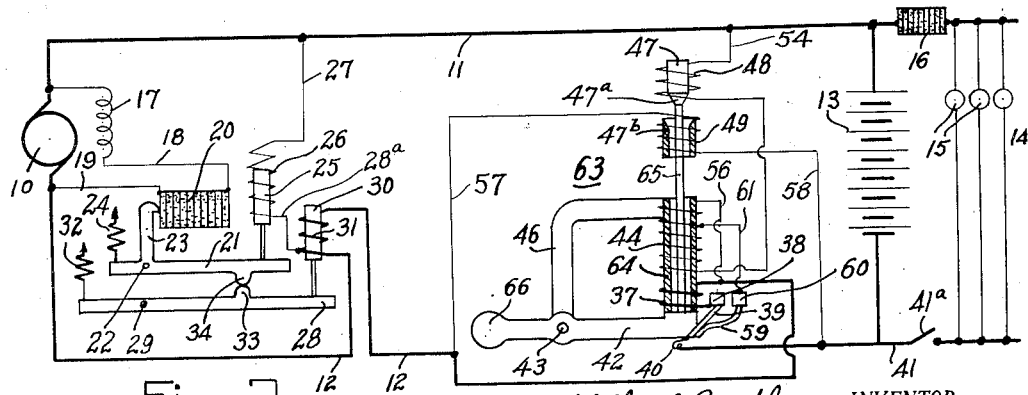
Figure 3 is a modification of the arrangement shown in Fig. 2.

In Figure 3 I have shown diagrammatically a system in which the mechanical features of the switch 62 of Figure 2 are shown as embodied in one of various possible mechanical forms. In Figure 3 the switching apparatus is indicated generally at 63, and its operation is substantially identical with that hereinabove described in connection with Figure 2. The armature 42 carries the main switch contact 39 and the auxiliary contact 59 cooperating respectively with the fixed contacts 38 and 60. The armature 42 is adapted to be acted upon by the voltage responsive coil 44 serially connected with the coil 48 of the solenoid, and the magnetic circuit of the coil 44 includes the yoke-like structure 46, but the core 64 of which is provided with an opening running therethrough so as to permit a rod 65, preferably of non-magnetic material to extend therethrough. The lower end of the rod 65 is pivotally connected in any suitable manner with the armature 42, and at its upper end carries the core 47 of the solenoid. The armature 42 is extended to the left of the pivot 43, as viewed in Figure 3, and at this extended portion is made of sufficient weight or mass, as is indicated at 66, so that the moving parts of the switch are mechanically substantially balanced in the manner hereinabove described in connection with Figures 1 and 2.

It will thus be seen that the desired operation and action of the system may be readily and reliably achieved, and that the connection to and disconnection from the storage battery of the generator may be made dependent accurately upon the desired or corresponding electrical factors involved rather than upon arbitrary mechanical factors; such mechanical factors impose upon the system of the general type referred to herein undesired limitations whereas, by making the coaction of the generator with the storage battery dependent principally upon electrical factors, the range of action and operation of the system is materially enlarged. Furthermore, these advantages will be seen to be achieved, together with the advantage whereby an unintentional or accidental connection of the generator to the storage battery may be reliably and dependably prevented.

As conducive to a clearer understanding of certain features of this invention, and as further conducive of clarifying a possible manner in which various features of this invention may be carried out, I have illustrated in Figures 4, 5 and 6 the mechanical features of the switching apparatus generally and diagrammatically indicated at 62 in Figure 2 and hereinbefore described. In these figures I have shown this switching apparatus in the form of one possible practical embodiment and the several parts thereof are conveniently mounted upon a base plate 67, which may be secured as to a panel by any suitable means. This base plate 67 is provided with a horizontally extending rib 68 at the upper portion thereof, preferably formed integrally therewith and at the right-hand end thereof, as viewed in Figure 4, there is mounted in depending relation from the rib 68 the core 45 (also diagrammatically indicated in Fig. 2). Surrounding this core is the voltage responsive lifting coil 44 and also the current holding coil 37. The rib 68 has a downwardly directed extension 69, at the lower end of which is pivotally mounted the armature generally indicated at 42 (and diagrammatically shown also in Fig. 2). The core 45, a portion of the rib 68, the downward extension 69 of the latter, and the armature 42 comprise a closed magnetic circuit in which the coils 44 and 37 may be made active.

Adjacent the right-hand side of the coils 44—37 and mounted upon a suitable bracket 70 (see also Fig. 6), preferably integrally formed with the base plate 67, is a contact block 38 (also diagrammatically indicated in Fig. 2) suitably insulated from the bracket or base plate. Coacting with the contact block 38 is the movable switch member 39, preferably taking the form of a brush of copper leaves, and secured as by the cap screw 71 to a block 72 of conducting material, in turn secured to the armature 42 as by the screws 73, but appropriately insulated therefrom, as by the insulating member 74. Attached to the left-hand end of the conducting block 72 is a downwardly directed strap 75 of conducting material, and to the latter is secured the flexible connecting lead 76 as by the bolt 77. The conducting lead 76 leads to an appropriate binding post 78, to which connection may be made as to the conductor 41 of Figure 2, for example.

The contact block 70 is connected to one terminal of the current holding coil 37, so that closure of the switch permits the resulting current flow in the circuit to pass through the coil 37, as is diagrammatically shown in Figure 2.

Secured to the contact block 38, as by the screws 79, but insulated therefrom in any suitable manner, is the auxiliary contact block 60. Conductor 61 connects contact block 60 to an intermediate turn in the coil 44. Attached to coact with contact block 60 is the auxiliary member 59 supported from the armature 42 and conveniently secured to the latter by means of the same cap screw 72 which secures the main switching member 39 thereto. This auxiliary contact member 59 is preferably in the form of an elongated spring leaf adapted normally to spring toward the contact brush 39, and is of such a length that, as the armature 42 moves in circuit opening direction from the position shown in Figure 4, the circuit between the contact members 38 and 39 is first interrupted and thereafter the circuit between the contact members 59 and 60 is interrupted; or vice versa, as the armature 42 is moved in circuit closing direction, the spring leaf contact 59 engages the fixed contact 60 before the brush 39 engages the fixed contact 38. The purpose of this arrangement will be made clear hereinafter.

The left-hand end (as viewed in Fig. 4) of the rib 68 supports the windings of the solenoid; more specifically, there is provided in the rib member 68 a suitable opening into which is fitted a tubular metallic member 79, the upper end of which is spun over as at 80 so as to be held in place with respect to the rib member 68. In the upper end of this tubular member 79 is rigidly fixed the core member 47b, the lower end of which is recessed in substantially conical form, as shown at 47c.

The lower end of the tubular member 79 may be held in place by means of a lower horizontally extending rib-like member 81, preferably integrally formed with the base plate 67. Surrounding the tubular member 79 is the winding of the solenoid, this winding comprising the coils 48 and 49, the terminals of which may lead to appropriate binding posts in order to permit their being placed in circuit, as indicated diagrammatically in Figure 2.

Within the tubular member 79, which is preferably non-magnetic, is movably mounted the core 47, shaped at its upper end as at 47a into a substantially conical form for coaction with the conical recess 47c of the fixed core member 47b. The upper end of the core 47 has rigidly secured thereto a rod 82 which extends upwardly through a suitable aperture in the fixed core member 47b, and at its upper end is pivotally connected as at 83 to a link 84 which at its right-hand end, as viewed in Figure 4, is pivotally supported upon a pin 85; the pin 85 is in turn supported by two ears 86 (see Fig. 6), preferably integrally formed with the rib-like member 68. With this construction the upper end of the core 47 is dependably supported and guided for movement in the direction of the axis of the solenoid windings.

The left-hand end of the armature 42, the pivot of which is generally indicated at 43, is provided with a suitable opening 87 into which is freely received the lower end of the core 47. The lower end of the core 47 is pivotally secured to the left-hand end of the armature 42, preferably by an arrangement which offers but slight frictional resistance to pivoting movement. In Figure 5 is shown a convenient form of pivotal connection for these parts.

The lower end of the core 47 is provided with an appropriate aperture 88, into the opposite ends of which are received the bearing portions of the swivel screws 89 and 90 respectively, threaded into the opposite side faces of the left-hand end of the armature 42. These screws permit convenient adjustment of the pivotal connection and after adjustment the screw 89 may be locked in place as by the lock nut 89a, whereas the swivel screw 90 may be locked in position as by the set screw 90a.

The pivotal support for the armature 42 is preferably also made as frictionless as possible, and in Figure 6 is indicated a preferred form of pivotal support for the armature 42. The lower and outer end of the downwardly extending portion 69 of the rib member 68 is arranged as at 91 to form a support for a pivot screw 92, the tapered bearing end of which fits into an appropriate recess in the front face of the armature 42; through the rear base plate 67, as at 93, is threaded a second pivot screw 94, the screw 94 being alined with the screw 92 and its tapered bearing portion fitting into an appropriate recess in the rear face of the armature 42. Such a pivotal mounting offers but very little friction to pivotal movement of the armature 42; moreover, the pivoting screws may be readily adjusted to take up wear, for example; and suitable means are provided for locking the screws in adjusted position. Thus, suitable set screws, such as the set screw 95 shown in Figure 4 in conjunction with the pivot screw 92, may be utilized for locking the pivot screws 92 and 94 in adjusted position.

The parts comprising the armature 42 and the parts related thereto, such as the core 47, for example, are appropriately proportioned as to their weight, so that the system of parts mechanically movable about the pivot generally indicated at 43, will be substantially balanced, as hereinbefore described, or may approach true balance to such an extent that any tendency for the parts to move without the action thereon of any magnetic forces will be in a circuit opening direction. At the extreme left-hand end of the armature 42 there is threaded therethrough a screw 96 positioned so that it will engage the left-hand end of the bracket portion 81 of the main frame, and thus adapted to form a stop for limiting the extent throughout which the armature 42 may move in circuit opening direction. This extent of movement may be predetermined if desired, as by adjustment of the screw 96, a suitable lock nut 97 being provided to lock the adjusting screw 96 in position. Inasmuch as, when the switching mechanism is open, the coil 44 must act upon the armature 42 through an air gap, the degree of sensitiveness of initial response of the armature 42 to the attraction produced by the coil 44 may be predetermined or adjusted at will by predetermining the width of the air gap with the armature in circuit opening position; this adjustment may be achieved by the screw 96.

The movement of the armature 42 in circuit closing direction will, as hereinbefore explained in connection with the spring leaf contact 59, bring about the interengagement of the contact 59 with the fixed contact block 60, slightly in advance of the engagement of the brush 39 with the block 38, thus short-circuiting those turns of the coil 44 included between the conductor 56 and the contact block 60; while this weakens the pull of the coil 44 during the circuit closing operation, any such weakening is compensated for by the fact that as the weakening of the coil 44 takes place, the reluctance of the magnetic circuit in which the coil 44 is effective is being decreased. This will be clear from the fact that the right-hand end of the armature 42 moves into contact with the pole face of the core 45 to decrease the air gap therebetween, so that the weakening of the coil 44 by the above-described action is thus prevented from affecting the secure closing of the circuit between the contacts 39 and 38.

On the other hand, as the generator slows down, or as its voltage decreases to approach that of the battery, so that the desired point is reached at which the generator is to be disconnected from the battery, the pull of coil 48 on the core 47 of the solenoid may more speedily overcome the holding effect of the weakened coil 44 as the current in the holding coil 37 approaches zero or reverses to a slight extent, thus to initiate the movement of the armature in circuit opening direction; an initial slight movement in this direction is sufficient to interpose between the armature 42 and the pole face of the core 45 a slight air gap, thus further weakening the holding action of the weakened coil 44. During this action the contact 39 may be separated from the contact block 38, but the short-circuiting contacts 59 and 60 will be still held in contact and their disengagement is permitted to take place only after the air gap between the armature 42 and the lower end of the core 45 has been made so large that the increase in strength of the coil 44 when the short-circuit of some of its turns (through contacts 59—60) is opened cannot effect a return movement of the armature 42 in circuit closing direction.

As hereinbefore noted in connection with the systems diagrammatically shown in Figures 1 and 2, the coil 49 of the solenoid is arranged to have more turns therein than the coil 48, and conveniently may be provided with twice as many turns as the coil 48 contains. With this latter arrangement, as hereinbefore noted, the rate of change in pull (as the generator voltage increases and prior to the closure of the contacts 38—39) is more rapid than the rate of change in pull of the coil 48, the pull of the former decreasing twice as fast as the pull of the latter increases. This arrangement insures the maintenance of the switch in open position until the voltage of the generator is substantially equal to the voltage of the battery, but is particularly advantageous in insuring a rapid closure of the switch should the voltage of the generator begin to exceed the voltage of the battery; this latter action is accompanied by a reversal in the current flow through the coil 49 so that the latter opposes the action of the coil 48, thus greatly weakening the holding action of the latter. Thus, the coil 44 may at once effect a closing of the switch. The coil 49, however, may be variously proportioned with respect to the coil 48 to achieve many of the features of this invention, but it should not be made so powerful with respect to the coil 48 that it will be effective to prevent the closure of the switch in case the battery be defective or its connection to either the conductors 11 or 41 interrupted, and when this condition is accompanied by a relatively low resistance in the translation circuit 14, the latter under these circumstances completes the circuit of the coil 49 to be energized by the generator current. It will thus be seen furthermore that the system may readily be embodied so as to cope successfully with the various changes, intentional or unintentional, to which the various parts of the system may be subjected.

It will thus be seen that there has been provided in this invention an electrical system of distribution peculiarly advantageous for car lighting purposes in which various objects hereinbefore noted, together with many advantages are achieved in a thoroughly practical manner. It will further be seen that the system provided, as well as the apparatus preferably employed for carrying out certain features of the invention is fully automatic in its action throughout in that the connection of the generator to the battery and its disconnection therefrom, is automatically placed in the control of mainly electrical factors which are thus made effective to bring about the desired action at the desired or appropriate moment. It will moreover be seen that there has been provided in this invention a system in which the various parts thereof are dependably safeguarded, and that the system and apparatus provided are well adapted to meet the conditions of hard practical use.

It might further be pointed out that there has been provided in this invention a system and apparatus capable of insuring in a reliable and dependable manner the desired operation to attain certain of the advantages hereinbefore noted, and throughout the wide changes and conditions met with in practice; but it might further be noted that the desired action and operation is effectively achieved irrespective of such influences as temperature changes. It is the usual practice to employ extraneous resistance devices generally of opposite temperature coefficient from that of the electrical parts with which they coact in order to approach consistency of action irrespective of temperature changes; by means of the invention hereinbefore described, the disadvantages inherent in the use of such extraneous resistance devices are effectively done away with and such devices may be entirely dispensed with. For example, referring by way of illustration to Figure 1, it will be seen that the operation of the system is controlled in part by the coils 44 and 48; these coils are conveniently connected serially and are thus affected by substantially the same current. These coils will therefore be similarly affected by temperature changes therein due, for example, to the heating effect thereon of the current flowing therethrough, and by reason of the relation of these coils to the remaining portions of the apparatus or system, it will be seen that the temperature effect in the one is substantially balanced out by the temperature effect in the other.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In apparatus of the character described, in combination, a generator, a storage battery, a pivoted member substantially balanced mechanically and having its center of mass substantially coincident with its axis and adapted upon movement in one direction to connect said generator to said battery, and two electromagnetic means exerting opposed tractive efforts upon said member, one tending to move said member in circuit-closing direction and the other tending to oppose such movement, said two electromagnetic means being arranged to permit the said one to preponderate over the said other substantially when the generator voltage equals the battery voltage.

2. In apparatus of the character described, in combination, a generator, a storage battery, a pivoted member substantially balanced mechanically and having its center of mass substantially coincident with its axis and adapted upon movement in one direction to connect said generator to said battery, and two electromagnetic means exerting opposed tractive efforts upon said member, one tending to move said member in circuit-closing direction and the other tending to oppose such movement, said two electromagnetic means being arranged to permit the said one to preponderate over the said other substantially when the generator voltage equals the battery voltage and one of said electromagnetic means being in the form of an electromagnet and said member constituting the armature therefor.

3. In apparatus of the character described, in combination, a generator, a storage battery, movable means, mechanically balanced, said means being pivoted to swing about an axis and having its center of mass substantially coincident with said axis, and including an armature and a solenoid core and arranged so that upon movement in one direction said generator will be connected to said storage battery and upon movement in reverse direction said generator will be disconnected from said storage battery, flux-producing means operative upon said armature to tend to move said movable means in one direction and flux-producing means operative upon said core to tend to move said movable means in the other direction, said flux-producing means being arranged to cause one to predominate over the other substantially when the generator voltage is substantially equal to the battery voltage.

4. In apparatus of the character described, in combination, a generator, a storage battery, a switch member pivoted at a point intermediate of its length for connecting said generator and said storage battery, electromagnetic means arranged to exert a tractive effort upon one side of the axis of said switch member tending to move the latter in one direction, and electromagnetic means arranged to exert a tractive effort upon the other side of the axis of said switch member tending to move the latter in reverse direction, said member having its center of mass substantially coincident with said axis and said two electromagnetic means being arranged so that one will preponderate over the other substantially when the generator voltage is substantially equal to the battery voltage.

5. In apparatus of the character described, in combination, a generator, a storage battery, a switch for connecting said generator and said battery, electromagnetic means arranged to exert a tractive effort upon said switch tending to move the latter in circuit-closing direction, electromagnetic means arranged to exert a tractive effort upon said switch tending to move the latter in reverse direction, and means for causing said first-mentioned means to preponderate over the second-mentioned means substantially when the generator voltage is substantially equal to the battery voltage, thereby to close said switch, and for causing said second-mentioned means to become preponderant over the first-mentioned means substantially when the generator voltage is substantially equal to the battery voltage, thereby to open said switch and to remain preponderant as long as the generator voltage is less than the battery voltage to hold said switch open.

6. In apparatus of the character described, in combination, a generator, a storage battery, a switch for connecting said generator and said storage battery, a coil responsive to generator voltage acting to close said switch, a coil for opposing the action of said first-mentioned coil and acting to move and hold said switch in circuit-opening position, means for causing said first-mentioned coil to predominate over said second-mentioned coil substantially when the generator voltage is substantially equal to the battery voltage, thereby to cause a closure of said switch, and means for decreasing the effect of said first-mentioned coil and operative substantially upon the closure of said switch.

7. In apparatus of the character described, in combination, a generator, a storage battery, a switch for connecting said generator and said storage battery, a coil responsive to generator voltage tending to close said switch, a coil for opposing the action of said first-mentioned coil, means for causing said first-mentioned coil to predominate over said second-mentioned coil substantially when the generator voltage is substantially equal to the battery voltage, thereby to cause a closure of said switch, and means for short-circuiting part of said first-mentioned coil upon the substantial closure of said switch.

8. In apparatus of the character described, in combination, a generator, a storage battery, a switch for connecting said generator and said battery, an electromagnet responsive to generator voltage and having an armature adapted upon movement by said magnet to close said switch, and means for opposing a closing movement of said switch by said electromagnet comprising a solenoid arranged to exert an opposing tractive effort upon said switch greater than the tractive effort of said magnet upon said armature as long as the generator voltage is less than the battery voltage.

9. In apparatus of the character described, in combination, a generator, a storage battery, a switch for connecting said generator and said battery, electromagnetic means arranged to exert a tractive effort upon said switch substantially proportional to the generator voltage and tending to close said switch, and means for opposing a closing movement of said switch by said electromagnetic means comprising a solenoid, the core of which is connected to said switch and the energizing winding of which includes a coil responsive to the difference between the generator voltage and the battery voltage.

10. In apparatus of the character described, in combination, a generator, a storage battery, a switch for connecting said generator and said battery, electromagnetic means arranged to exert a tractive effort upon said switch substantially proportional to the generator voltage and tending to close said switch, and means for opposing a closing movement of said switch comprising a solenoid the core of which is connected to said switch and having an energizing coil responsive to generator voltage and an energizing coil responsive to the difference between generator voltage and battery voltage.

11. In apparatus of the character described, in combination, a generator, a storage battery, a switch for connecting said generator and said battery, electromagnetic means arranged to exert a tractive effort upon said switch substantially proportional to the generator voltage and tending to close said switch, electromagnetic means arranged to act in opposition to said first-mentioned means including a coil for exerting an opposing tractive effort upon said switch substantially equal to the tractive effort exerted thereon by said first-mentioned means, and means for supplementing the tractive effort of said coil to cause said switch to be held open while the generator voltage is less than the battery voltage and for counteracting the tractive effort of said coil when the battery voltage exceeds the generator voltage.

12. In apparatus of the character described, in combination, a generator, a storage battery, a switch for connecting said generator and said battery, electromagnetic means arranged to exert a tractive effort upon said switch substantially proportional to the generator voltage and tending to close said switch, electromagnetic means arranged to act in opposition to said first-mentioned means including a coil for exerting an opposing tractive effort upon said switch substantially equal to the tractive effort exerted thereon by said first-mentioned means, and a coil responsive to the difference between generator voltage and battery voltage and effective throughout changes in the former for affecting the tractive effort of said coil.

13. In apparatus of the character described, in combination, a generator, a storage battery, a switch for connecting said generator to said battery, a coil tending to move said switch in circuit-closing direction, a coil tending to move said switch in circuit-opening direction, said two coils being responsive substantially to generator voltage, electromagnetic means coacting with said second-mentioned coil and adapted to assist the latter during the range from substantially zero voltage to battery voltage, thereby to cause said switch to be held open, and to oppose said second-mentioned coil during a range from substantially zero voltage to the difference between generator voltage and battery voltage when the former exceeds the latter, thereby to permit said first-mentioned coil to preponderate over said second-mentioned coil and to close said switch, a coil responsive to the current flow from the generator to the battery for assisting in holding said switch in closed position, and means for decreasing the strength of said first-mentioned coil substantially upon the closure of said switch.

14. In apparatus of the character described, in combination, a generator, a storage battery, a switch for connecting said generator to said battery, a coil tending to move said switch in circuit-closing direction, a coil tending to move said switch in circuit-opening direction, said two coils being responsive substantially to generator voltage, means for causing said first-mentioned coil to preponderate over said second-mentioned coil, thereby to close said switch, substantially when the generator voltage equals the battery voltage, a coil responsive to the current flow from the generator to the battery for assisting in holding said switch in closed position, and means for decreasing the strength of said first-mentioned coil and increasing the strength of said second-mentioned coil and effective substantially upon the closure of said switch.

15. In apparatus of the character described, in combination, a generator, a storage battery, a switch for connecting said battery and said generator, two coils serially connected across said generator, the one coil tending to close said switch and the other coil tending to hold said switch open, electromagnetic means coacting with said second-mentioned coil and adapted to assist the latter during the range from substantially zero voltage to battery voltage, thereby to cause said switch to be held open, and to oppose said second-mentioned coil during a range from substantially zero voltage to the difference between generator voltage and battery voltage when the former exceeds the latter, thereby to permit said first-mentioned coil to preponderate over said second-mentioned coil and to close said switch, and means for decreasing the strength of said first-mentioned coil effective substantially upon the closure of said switch.

16. In apparatus of the character described, in combination, a generator, a storage battery, a switch for connecting said battery and said generator, two coils serially connected across said generator, the one coil tending to close said switch and the other coil tending to hold said switch open, means for causing said first-mentioned coil to preponderate over said second-mentioned coil substantially when the generator voltage equals the battery voltage, thereby to close said switch, and means effective substantially upon the closure of said switch for decreasing the strength of said first-mentioned coil and increasing the strength of said second-mentioned coil.

17. In apparatus of the character described, in combination, a generator, a storage battery, a switch for connecting said battery and said generator, two coils serially connected across said generator, the one coil tending to close said switch and the other coil tending to hold said switch open, means for causing said first-mentioned coil to preponderate over said second-mentioned coil substantially when the generator voltage equals the battery voltage, thereby to close said switch, and means effective substantially upon the closure of said switch for short-circuiting part of said first-mentioned coil.

18. In apparatus of the character described, in combination, a generator, a storage battery, a switch for connecting said generator and said battery, means responsive to the difference between the generator voltage and the battery voltage for holding said switch in open position, a voltage responsive coil for closing said switch, and a coil coacting with said first-mentioned means to prevent a reversal of current therein when the generator voltage exceeds that of the battery from holding said switch open.

19. In apparatus of the character described, in combination, a generator, a storage battery, a switch for connecting said generator and said battery, said switch being actuated by a pivoted member having its center of mass substantially coincident with the axis of pivoting thereof, a coil responsive to the difference between generator voltage and battery voltage and acting upon said member at one side of its axis for holding said switch open, a coil responsive to current exchange between said generator and said battery for holding said switch closed when the generator charges said battery, and electromagnetic means connected across the main line between said generator and said battery for coacting with said first-mentioned coil to prevent the latter from holding said switch open when the generator voltage exceeds the battery voltage, thus to cause closure of said switch, and for coacting with said second-mentioned coil to cause the latter to effect an opening of said switch when the battery discharges current through the generator.

In testimony whereof, I have signed my name to this specification this third day of February, 1925.

WILLEM C. BROEKHUYSEN.